United States Patent
Kumamoto

(10) Patent No.: US 10,263,270 B2
(45) Date of Patent: Apr. 16, 2019

(54) REDOX FLOW BATTERY SYSTEM AND METHOD FOR OPERATING REDOX FLOW BATTERY SYSTEM

(71) Applicant: Sumitomo Electric Industries, Ltd., Osaka-shi (JP)

(72) Inventor: Takahiro Kumamoto, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 133 days.

(21) Appl. No.: 15/311,723

(22) PCT Filed: May 7, 2015

(86) PCT No.: PCT/JP2015/063172
§ 371 (c)(1),
(2) Date: Nov. 16, 2016

(87) PCT Pub. No.: WO2015/182339
PCT Pub. Date: Dec. 3, 2015

(65) Prior Publication Data
US 2017/0098849 A1    Apr. 6, 2017

(30) Foreign Application Priority Data

May 28, 2014 (JP) .................................. 2014-110516

(51) Int. Cl.
*H01M 2/00* (2006.01)
*H01M 8/18* (2006.01)
(Continued)

(52) U.S. Cl.
CPC ............. *H01M 8/188* (2013.01); *H01M 8/04* (2013.01); *H01M 8/043* (2016.02);
(Continued)

(58) Field of Classification Search
CPC ......... H01M 8/01223; H01M 8/04225; H01M 8/04537; H01M 8/04544; H01M 8/04552;
(Continued)

(56) References Cited

U.S. PATENT DOCUMENTS 3,540,934 A * 11/1970 Boeke ..................... H01M 8/20
                                                                429/101
9,893,385 B1 * 2/2018 Nayar .................. H01M 10/425
(Continued)

FOREIGN PATENT DOCUMENTS

CN        102354761 B        12/2013
JP        S63-281362 A       11/1988
(Continued)

OTHER PUBLICATIONS

International Search Report in counterpart International Application No. PCT/JP2015/063172, dated Aug. 11, 2015.

*Primary Examiner* — Anthony R Jimenez
(74) *Attorney, Agent, or Firm* — Baker Botts L.L.P.; Michael A. Sartori

(57) ABSTRACT

A redox flow battery system includes a plurality of branch circuits electrically connecting a plurality of battery cell parts in parallel; a switching unit configured to switch conduction states of a closed loop in which the branch circuits are connected together; a circulation mechanism; a detection unit; a determination unit configured to determine whether or not a voltage difference between the open circuit voltages of the battery cell parts is more than a predetermined value; and a control unit configured to control a switching operation of the switching unit such that, when the determination unit determines the voltage difference to be more than the predetermined value, the closed loop is brought into a non-conducting state and, when the determination unit determines the voltage difference to be equal to (Continued)

or less than the predetermined value, the closed loop is brought into a conducting state.

8 Claims, 7 Drawing Sheets

(51) Int. Cl.
  *H01M 8/04* (2016.01)
  *H01M 8/04537* (2016.01)
  *H01M 8/043* (2016.01)
  *H01M 8/04858* (2016.01)
  *H01M 8/04186* (2016.01)
(52) U.S. Cl.
  CPC ... *H01M 8/04186* (2013.01); *H01M 8/04544* (2013.01); *H01M 8/04949* (2016.02); *H01M 8/18* (2013.01); *Y02E 60/528* (2013.01)
(58) Field of Classification Search
  CPC ......... H01M 8/04559; H01M 8/04567; H01M 8/04604; H01M 8/04611; H01M 8/04619; H01M 8/04626; H01M 8/04634; H01M 8/04641; H01M 8/04649; H01M 8/04746; H01M 8/04768; H01M 8/04858; H01M 8/04925; H01M 8/04932; H01M 8/0494; H01M 8/04947; H01M 8/08
  See application file for complete search history.

(56) References Cited

U.S. PATENT DOCUMENTS

2009/0123813 A1\* 5/2009 Chiang ............... C01B 25/45
  429/50
2013/0022846 A1 1/2013 Liu et al.

FOREIGN PATENT DOCUMENTS

| JP | 2004-265821 A | 9/2004 |
| JP | 2006-040591 A | 2/2006 |
| WO | 03/005476 A1 | 1/2003 |
| WO | 2004/079849 A1 | 9/2004 |
| WO | 2008/148148 A1 | 12/2008 |

\* cited by examiner

20A: 21, 22, 23, 24, 25~28

REDOX FLOW BATTERY SYSTEM AND METHOD FOR OPERATING REDOX FLOW BATTERY SYSTEM

TECHNICAL FIELD

The present invention relates to a redox flow battery system including a redox flow battery, which is one of storage batteries, and a method for operating the redox flow battery system. In particular, the present invention relates to a redox flow battery system that enables suppression of occurrence of a problem during supply of an electrolyte to battery cell parts connected in parallel, and a method for operating the redox flow battery system.

BACKGROUND ART

In recent years, with electric power shortage becoming serious, there have been challenges that are global rapid adoption of natural energy such as the adoption of wind power generation and solar photovoltaic power generation and the stabilization of power systems (for example, maintaining of frequency and voltage). One technique for addressing the challenges has been attracting attention and this technique is to install high-capacity storage batteries to achieve, for example, smoothing of output variations, storage of surplus power, and load leveling.

One of such high-capacity storage batteries is a redox flow battery (hereafter, sometimes referred to as a RF battery). The RF battery is charged and discharged by using the oxidation-reduction potential difference between ions contained in the positive electrode electrolyte and ions contained in the negative electrode electrolyte. FIG. 6 illustrates the principle of the operation of a RF battery 100 using vanadium ions as the positive and negative active materials. As illustrated in FIG. 6, the RF battery 100 includes a battery cell 100C that is divided into a positive electrode cell 102 and a negative electrode cell 103 by a membrane 101, which is permeable to hydrogen ions (protons). The positive electrode cell 102 contains a positive electrode 104, and is connected through ducts 108 and 110 to a positive electrode electrolyte tank 106 storing a positive electrode electrolyte. Similarly, the negative electrode cell 103 contains a negative electrode 105, and is connected through ducts 109 and 111 to a negative electrode electrolyte tank 107 storing a negative electrode electrolyte. The electrolytes stored in the tanks 106 and 107 are circulated through the cells 102 and 103 by pumps 112 and 113 during charge and discharge.

As illustrated in the lower part of FIG. 7, in general, the battery cell 100C is formed within a structure referred to as a cell stack 200. As illustrated in the upper part of FIG. 7, the cell stack 200 has a configuration in which such battery cells 100C having the positive electrode 104, the membrane 101, and the negative electrode 105 are stacked so as to be interposed between cell frames 120, which include a bipolar plate 121 integrated with a frame 122. In this configuration, each battery cell 100C is formed between bipolar plates 121 of adjacent cell frames 120. The gaps between the cell frames 120 are sealed with sealing structures 127.

In the cell stack 200, the electrolytes are passed through the battery cells 100C via liquid supply manifolds 123 and 124 and liquid drainage manifolds 125 and 126, which are formed in the frames 122. The positive electrode electrolyte is supplied through the liquid supply manifold 123, then through a groove formed in one surface (the surface illustrated as being exposed in the drawing) of the frame 122, to the positive electrode 104, which is disposed on the one surface of the bipolar plate 121. This positive electrode electrolyte is drained through a groove formed in an upper portion of the frame 122 to the liquid drainage manifold 125. Similarly, the negative electrode electrolyte is supplied through the liquid supply manifold 124, then through a groove formed in the other surface (the surface illustrated as being hidden in the drawing) of the frame 122, to the negative electrode 105, which is disposed on the other surface of the bipolar plate 121. This negative electrode electrolyte is drained through a groove formed in an upper portion of the frame 122 to the liquid drainage manifold 126.

The RF battery is charged with power supplied from, for example, a power plant via, for example, an alternating current/direct current converter; and is discharged to supply the charged power to a load via, for example, the alternating current/direct current converter. In order to obtain a larger power from the power system or to supply a larger power to the load, battery cell parts including battery cells as the main components (for example, cell stacks described above) may be electrically connected in parallel. Patent Literature 1 discloses a RF battery in which a single cell stack includes plural divided cells (hereafter, sometimes referred to as battery cell parts). This RF battery includes a switching unit that enables selection of desired battery cell parts, electrical connection of the selected battery cell parts in parallel, and charge and discharge of the selected battery cell parts. This RF battery can be operated with high energy efficiency in response to the amount of charge or discharge.

CITATION LIST

Patent Literature

PTL 1: Japanese Unexamined Patent Application Publication No. 2006-040591

SUMMARY OF INVENTION

Technical Problem

When plural battery cell parts are connected in parallel, during supply of the positive electrode electrolyte and the negative electrode electrolyte to the battery cell parts prior to starting of the operation of the RF battery, some battery cell parts may become overcharged in spite of no charge or discharge of the battery cell parts with the power system via the alternating current/direct current converter.

The present invention has been made under the above-described circumstances. An object of the present invention is to provide a RF battery system that enables suppression of occurrence of such a problem during supply of an electrolyte to battery cell parts connected in parallel. Another object of the present invention is to provide a RF battery system operation method that enables suppression of occurrence of the problem during supply of an electrolyte to battery cell parts connected in parallel.

Solution to Problem

A redox flow battery system according to an aspect of the present invention includes plural branch circuits, a switching unit, a circulation mechanism, a detection unit, a determination unit, and a control unit. The plural branch circuits electrically connect plural battery cell parts in parallel. The switching unit is configured to switch conduction states of a closed loop in which the branch circuits are connected together. The circulation mechanism includes a tank configured to store an electrolyte, and a pump configured to circulate the electrolyte from the tank to the battery cell parts. The detection unit is configured to detect physical quantities correlating with open circuit voltages of the battery cell parts. The determination unit is configured to determine, on the basis of the physical quantities detected by the detection unit, as to whether or not a voltage difference between the open circuit voltages of the battery cell parts is more than a predetermined value. The control unit is configured to control a switching operation of the switching unit such that, when the determination unit determines the voltage difference to be more than the predetermined value, the closed loop is brought into a non-conducting state and, when the determination unit determines the voltage difference to be equal to or less than the predetermined value, the closed loop is brought into a conducting state.

A method for operating a redox flow battery system according to an aspect of the present invention is a method for operating a redox flow battery system in which an electrolyte is circulated through plural battery cell parts that are electrically connected in parallel via plural branch circuits, and the method includes the following steps:

a detection step of detecting physical quantities correlating with open circuit voltages of the battery cell parts;

a determination step of determining, on the basis of the physical quantities, as to whether or not a voltage difference between the open circuit voltages of the battery cell parts is more than a predetermined value; and a switching control step of, on the basis of a result of the determination, when the voltage difference is more than the predetermined value, bringing a closed loop in which the branch circuits are connected together into a non-conducting state and, when the voltage difference is equal to or less than the predetermined value, bringing the closed loop into a conducting state.

Advantageous Effects of Invention

The above-described redox flow battery system enables suppression of occurrence of the problem during supply of an electrolyte to battery cell parts connected in parallel. The above-described method for operating a redox flow battery system facilitates suppression of occurrence of the problem during supply of an electrolyte to battery cell parts connected in parallel.

DESCRIPTION OF EMBODIMENTS

Figure 1:
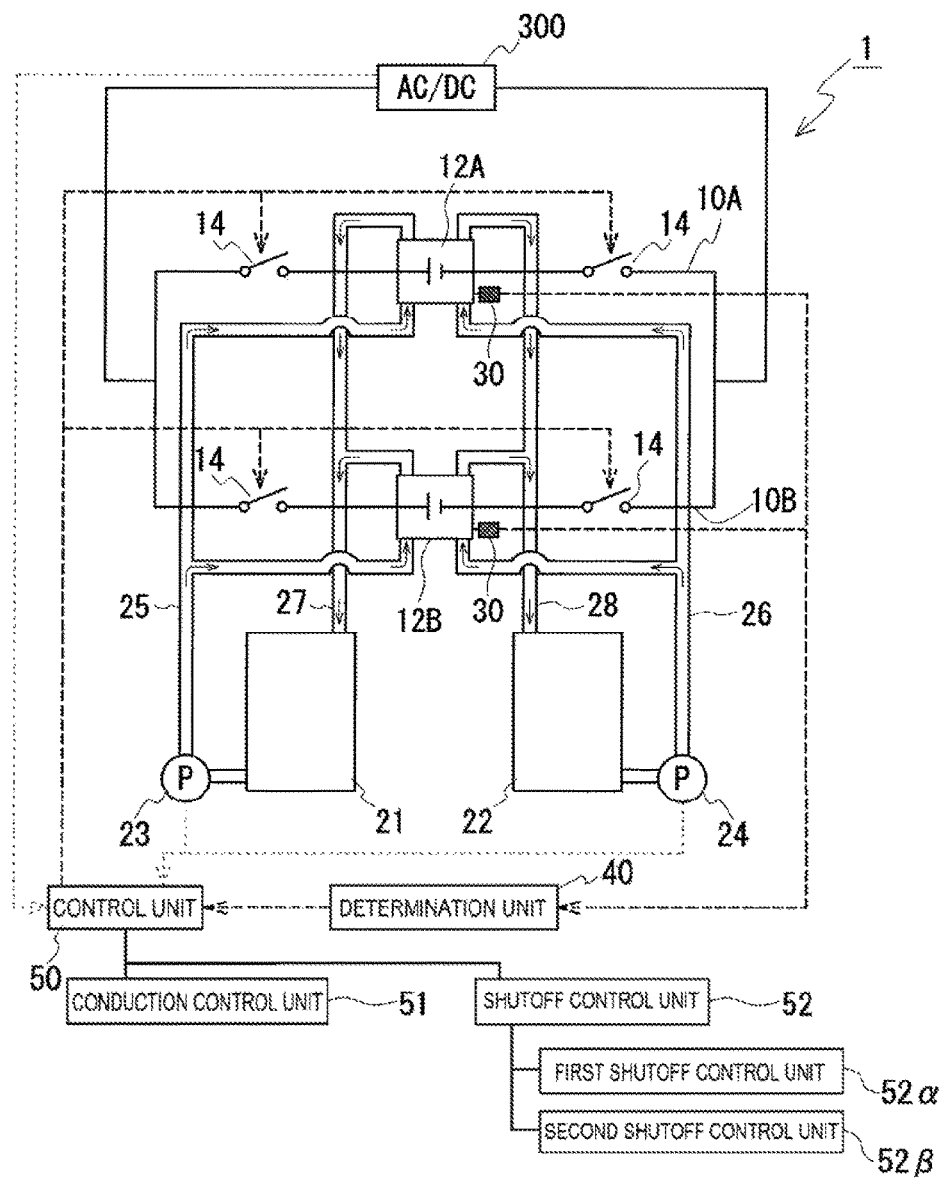
FIG. 1 is a schematic diagram illustrating the configuration of a redox flow battery system according to Embodiment 1.

[Description of Embodiments of the Present Invention]

The inventors of the present invention examined overcharged battery cell parts and have found that these battery cell parts and the other battery cell parts connected in parallel are different in the amount of electrolyte. Accordingly, a single common circulation mechanism (a tank and a pump for a positive electrode electrolyte, and a tank and a pump for a negative electrode electrolyte) is used to supply the positive electrode electrolyte and the negative electrode electrolyte to electrolyte-unfilled and empty battery cell parts, and the amounts of electrolytes supplied to the battery cell parts are observed. As a result, the following has been found: the larger the distance of a battery cell part from a pump or the higher the position of a battery cell part disposed, the smaller the amount of electrolyte in the battery cell part. In other words, the amounts of electrolytes in battery cell parts are not uniform. In plural battery cell parts electrically connected in parallel, when the amounts of electrolytes in the battery cell parts are not uniform, these amounts of electrolytes result in non-uniformity in the open circuit voltages of the battery cell parts. Specifically, the larger the amounts of electrolytes in battery cell parts, the higher the voltages of the battery cell parts. Thus, a voltage difference is generated between battery cell parts depending on the amounts of electrolytes. This voltage difference causes currents to pass from high-voltage battery cell parts to low-voltage battery cell parts. As a result, battery cell parts having small amounts of electrolytes probably become overcharged. Accordingly, the inventors consider a configuration of a RF battery system in which plural battery cell parts are electrically connected in parallel, the configuration enabling control of suppressing the occurrence of the problem during supply of electrolytes to the battery cell parts. As a result, the inventors have accomplished the present invention. Hereinafter, features of embodiments of the present invention will be listed and described.

(1) A redox flow battery system according to an embodiment includes plural branch circuits, a switching unit, a circulation mechanism, a detection unit, a determination unit, and a control unit. The plural branch circuits electrically connect plural battery cell parts in parallel. The switching unit is configured to switch conduction states of a closed loop in which the branch circuits are connected together. The circulation mechanism includes a tank configured to store an electrolyte, and a pump configured to circulate the electrolyte from the tank to the battery cell parts. The detection unit is configured to detect physical quantities correlating with open circuit voltages of the battery cell parts. The determination unit is configured to determine, on the basis of the physical quantities detected by the detection unit, as to whether or not a voltage difference between the open circuit voltages of the battery cell parts is more than a predetermined value. The control unit is configured to control a switching operation of the switching unit such that, when the determination unit determines the voltage difference to be more than the predetermined value, the closed loop is brought into a non-conducting state and, when the determination unit determines the voltage difference to be equal to or less than the predetermined value, the closed loop is brought into a conducting state.

Such a battery cell part herein includes, as the main component, a battery cell including a positive electrode cell containing a positive electrode, a negative electrode cell containing a negative electrode, and a membrane dividing these cells from each other and being permeable to predetermined ions. The battery cell part is, for example, a single cell including such a single battery cell, or a cell stack including a stack of plural battery cells. Alternatively, when plural openings are formed in each cell frame and a battery cell (divided cell) is provided for each opening, the battery cell part may be such a divided cell formed for each opening.

The reason why some of battery cell parts connected in parallel become overcharged is as follows: when an electrolyte is supplied to electrolyte-unfilled and empty battery cell parts, as described above, the amounts of electrolyte in the battery cell parts become non-uniform; as a result, a voltage difference is generated between battery cell parts and, in spite of small amounts of electrolyte in some battery cell parts, currents pass from the other battery cell parts to the some battery cell parts. The time when the amounts of electrolyte in battery cell parts become non-uniform and a voltage difference is generated is mainly, prior to starting of the operation of the RF battery, the time of filling the battery cell parts with the electrolyte. For example, in the initial state of the RF battery in which the battery cell parts are not filled with the electrolyte and are empty, when the electrolyte is supplied to the battery cell parts, the amounts of electrolyte become non-uniform between the battery cell parts and these amounts of electrolyte tend to result in generation of a voltage difference. In addition, after the RF battery is on standby in which the pump is stopped and the electrolyte is temporarily drained from the battery cell parts to suppress self-discharge, starting of the operation of the RF battery requires re-introduction of the electrolyte; during this introduction of the electrolyte, the above-described non-uniformity of the electrolyte occurs and the amounts of electrolyte tend to result in generation of a voltage difference. In addition, when the RF battery is left on standby for a long time in which the pump is stopped and the battery cell parts are filled with the electrolyte, self-discharge causes a decrease in the voltage of the electrolyte within the battery cell parts, compared with the electrolyte within the tank; in this state, re-introduction of the electrolyte for starting the operation of the RF battery causes a further change in the voltage, which tends to result in generation of a voltage difference. Furthermore, when the electrolytes individually left in the battery cell parts undergo self-discharge to different degrees, a voltage difference may be generated between the battery cell parts before re-introduction of the electrolyte.

According to the above-described configuration, physical quantities correlating with the open circuit voltages of the battery cell parts are detected, and when a voltage difference between the battery cell parts is determined to be more than the predetermined value on the basis of the physical quantities, the control is performed such that the closed loop is brought into the non-conducting state. Thus, even when a voltage difference is generated between the battery cell parts, no current flows in the closed loop. This enables suppression of occurrence of the problem in which some battery cell parts become overcharged in spite of no charge or discharge of the battery cell parts with the power system via the alternating current/direct current converter. When the voltage difference between the battery cell parts is determined to be equal to or less than the predetermined value, the control may be performed such that the closed loop is brought into the conducting state.

(2) In the redox flow battery system according to the embodiment, the switching unit may be provided in both end portions of each branch circuit.

When the switching unit is provided in both end portions of each branch circuit, the conduction state of the closed loop can be controlled with certainty.

(3) In the redox flow battery system according to the embodiment, the detection unit may include a voltmeter configured to detect the open circuit voltages. The determination unit is configured to determine, on the basis of the open circuit voltages, as to whether or not the voltage difference that is more than the predetermined value is generated.

According to this configuration, the open circuit voltages of the battery cell parts are detected, so that the voltage difference between the battery cell parts can be ascertained with certainty.

(4) In the redox flow battery system according to the embodiment, the detection unit may include an electrolyte detection unit configured to detect a non-electrical quantity correlating with flow states of the electrolyte in the battery cell parts. The determination unit is configured to determine, on the basis of the non-electrical quantity, as to whether or not the voltage difference that is more than the predetermined value is generated.

As long as the battery cell parts contain the electrolyte of the same composition and the same state of charge, the open circuit voltages of the battery cell parts depend on the amounts of electrolyte within the battery cell parts. Accordingly, as the physical quantities correlating with the open circuit voltages of battery cell parts, a non-electrical quantity correlating with flow states of the electrolyte may be detected. By detecting the non-electrical quantity of the battery cell parts, the amounts of electrolyte of the same composition and the same state of charge within the battery cell parts can be ascertained and the voltage difference between the battery cell parts can be ascertained. Specific examples of the non-electrical quantity will be described later.

The state of charge (SOC, also referred to as charging depth) denotes the concentration of the active material in each electrolyte of the positive electrode electrolyte and the negative electrode electrolyte. For example, when the positive electrode electrolyte is a solution containing pentavalent and tetravalent vanadium ions ($V^{5+}/V^{4+}$), and the negative electrode electrolyte is a solution containing divalent and trivalent vanadium ions ($V^{2+}/V^{3+}$), SOCs are represented by the following formulae.

V (pentavalent)/{V (pentavalent)+V (tetravalent)}, where V (pentavalent) represents the concentration of pentavalent vanadium ions (mol/L), and V (tetravalent) represents the concentration of tetravalent vanadium ions (mol/L).

V (divalent)/{V (trivalent)+V (divalent)}, where V (divalent) represents the concentration of divalent vanadium ions (mol/L), and V (trivalent) represents the concentration of trivalent vanadium ions (mol/L).

(5) In the redox flow battery system according the embodiment, the detection unit may include a timer, and this timer is configured to detect, as the non-electrical quantity, a time elapsed from starting of an operation of the pump. The determination unit is configured to determine, on the basis of as to whether or not the time reaches a predetermined time, as to whether or not the voltage difference that is more than the predetermined value is generated.

As the non-electrical quantity, the time correlating with the amounts of electrolyte within the battery cell parts may be detected. The correlations between the elapsed time from the starting of the operation of the pump and the amounts of supplied electrolyte filling the battery cell parts are measured in advance. On the basis of these correlations, the amounts of electrolyte within the battery cell parts can be ascertained. Accordingly, the time at which the amounts of electrolyte filling the battery cell parts substantially become uniform is defined as the predetermined time, so that switching of the switching unit can be readily performed when the predetermined time has elapsed. The amounts of electrolyte are thus ascertained on the basis of time, which eliminates the necessity of installation of additional devices for measuring the amounts of electrolyte.

(6) In the redox flow battery system according to the embodiment, the control unit may include a first shutoff control unit configured to switch the switching unit such that the closed loop is in the non-conducting state during stopping of the pump.

During stopping of the pump and temporary draining of the electrolyte from the battery cell parts for suppressing self-discharge, even when the amounts of draining vary between the battery cell parts, the closed loop is in the non-conducting state, so that flowing of current can be suppressed.

(7) The redox flow battery system according to the embodiment may include an alternating current/direct current converter electrically connected to the battery cell parts, wherein the control unit may include a second shutoff control unit configured to switch the switching unit such that the closed loop is in the non-conducting state during stopping of the alternating current/direct current converter.

When the alternating current/direct current converter is stopped, the battery cell parts are not charged or discharged with the power system via the alternating current/direct current converter. Thus, overcharging due to a voltage difference between battery cell parts in the closed loop needs to be effectively suppressed. For this reason, the closed loop is brought into the non-conducting state during stopping of the alternating current/direct current converter, so that overcharging between battery cell parts can be effectively suppressed.

(8) A method for operating a redox flow battery system according to an embodiment is a method for operating a redox flow battery system in which an electrolyte is circulated through plural battery cell parts that are electrically connected in parallel via plural branch circuits, and the method includes the following steps:

a detection step of detecting physical quantities correlating with open circuit voltages of the battery cell parts;

a determination step of determining, on the basis of the physical quantities, as to whether or not a voltage difference between the open circuit voltages of the battery cell parts is more than a predetermined value; and a switching control step of, on the basis of a result of the determination, when the voltage difference is more than the predetermined value, bringing a closed loop in which the branch circuits are connected together into a non-conducting state and, when the voltage difference is equal to or less than the predetermined value, bringing the closed loop into a conducting state.

According to the above-described configuration, when the voltage difference between the battery cell parts is determined to be more than the predetermined value on the basis of physical quantities, the closed loop is brought into the non-conducting state, so that no current flows. This enables suppression of occurrence of the problem in which some battery cell parts become overcharged in spite of no charge or discharge of the battery cell parts with the power system via the alternating current/direct current converter. When the voltage difference between the battery cell parts is equal to or less than the predetermined value, the closed loop may be brought into the conducting state.

[Details of Embodiments of the Present Invention]

Hereinafter, details of embodiments of the present invention will be described. However, the scope of the present invention is not limited to such examples but is indicated by Claims. The scope of the present invention is intended to embrace all the modifications within the meaning and range of equivalency of the Claims. In the drawings, the same reference signs denote components having the same name.

<Embodiment 1>

[RF Battery System]

Referring to FIG. 1, a RF battery system 1 of Embodiment 1 will be described. Typically, the RF battery system 1 is operated to be charged and discharged while being connected to a power generation unit (for example, a solar photovoltaic power generator, a wind power generator, or another ordinary power plant, not shown) and a load (for example, a power system or a consumer, not shown) via, for example, a transformer facility (not shown) electrically connected to an alternating current/direct current converter (AC/DC) 300. The RF battery system 1 is applied as with existing RF batteries.

The RF battery system 1 includes two branch circuits 10A and 10B in which two battery cell parts 12A and 12B are electrically connected in parallel; a switching unit 14 provided in both end portions of each of the branch circuits 10A and 10B; and a circulation mechanism 20A configured to supply electrolytes to the battery cell parts 12A and 12B. The battery cell parts 12A and 12B are electrically connected to the alternating current/direct current converter 300. The switching unit 14 switches the conduction states of the electrically connected closed loop formed by the branch circuits 10A and 10B. The RF battery system 1 of Embodiment 1 has main features that it includes a detection unit 30, which detects physical quantities correlating with the open circuit voltages of the battery cell parts 12A and 12B; a determination unit 40, which determines as to whether or not a voltage difference that is more than a predetermined value is generated between the battery cell parts 12A and 12B on the basis of the detected physical quantities; and a control unit 50, which controls the switching operation of the switching unit 14 on the basis of the result of the determination.

[Battery Cell Parts]

Figure 6:
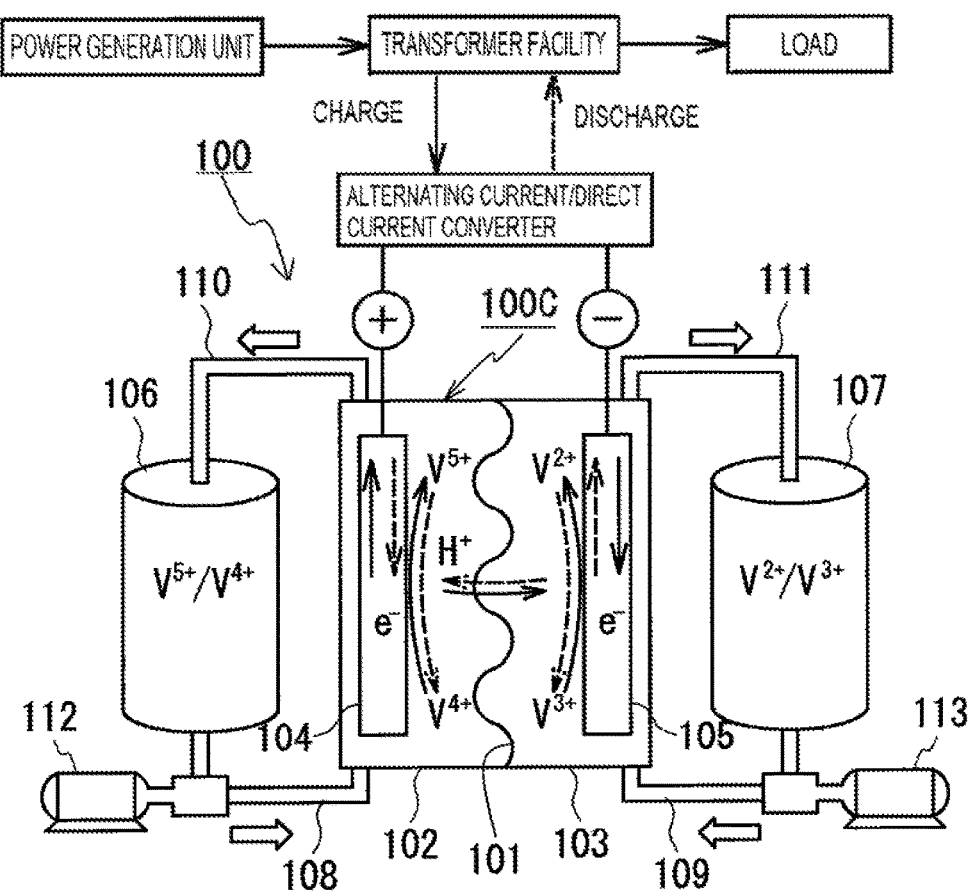
FIG. 6 is a schematic diagram illustrating the principle of a redox flow battery.
Figure 7:
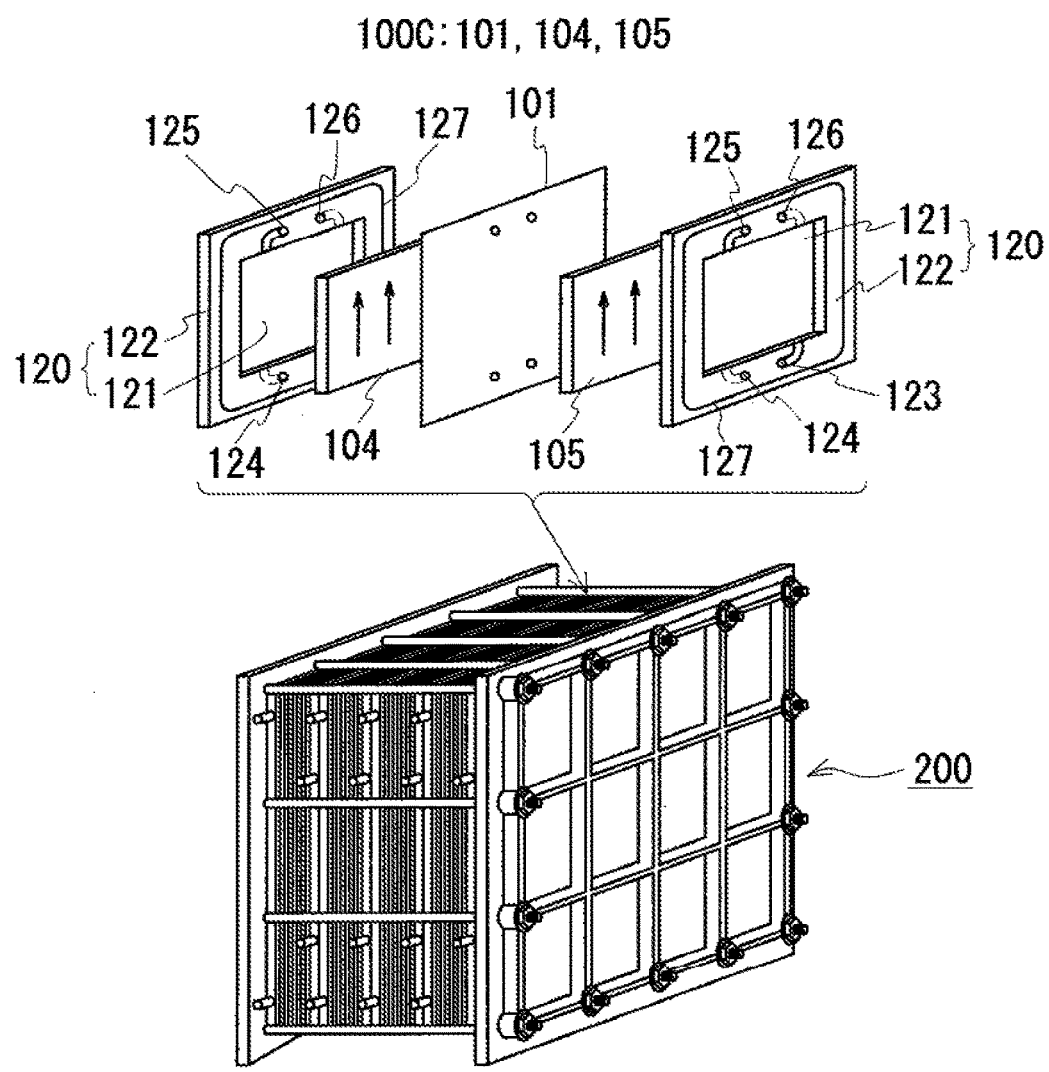
FIG. 7 is a schematic diagram illustrating the configuration of a cell stack of a redox flow battery.

The battery cell parts 12A and 12B each include, as a main component, a battery cell 100C (refer to FIGS. 6 and 7), which includes a positive electrode cell 102 containing a positive electrode 104, a negative electrode cell 103 containing a negative electrode 105, and a membrane 101 dividing the cells 102 and 103 from each other and being permeable to predetermined ions. The battery cell parts 12A and 12B may each be, for example, a single cell including a single battery cell 100C or a cell stack 200 (refer to FIG. 7) including a stack of plural battery cells 100C. Alternatively, when plural openings are formed in each cell frame and a battery cell (divided cell) is provided for each opening, the battery cell parts 12A and 12B may be such divided cells individually formed for the openings. The battery cell parts 12A and 12B are easily made to provide a high power output by electrically connecting plural cell stacks 200 in parallel. Such a RF battery including cell stacks may employ a configuration that is the same as the configuration of the existing RF battery 100, which has been described with reference to FIGS. 6 and 7. Thus, detailed description of this configuration will be omitted.

The battery cell parts 12A and 12B are electrically connected in parallel with the branch circuits 10A and 10B. The configuration of this parallel connection may be, for example, a configuration in which plural battery cells are connected in parallel, a configuration in which plural cell stacks are connected in parallel, or a configuration in which plural divided cells are connected in parallel. In this embodiment, the two branch circuits 10A and 10B form an electrically connected closed loop. Alternatively, three or more branch circuits may form plural closed loops.

[Switching Unit]

The switching unit 14 switches the conduction states of the electrically connected closed loop formed by the branch circuits 10A and 10B. This switching unit 14, which is configured to at least electrically shut off the closed loop, is provided at least in an end portion of one branch circuit out of the branch circuits 10A and 10B. Obviously, the switching unit 14 may be provided in one end portion alone of each of the branch circuits 10A and 10B. In this embodiment, the switching unit 14 is provided in both end portions of each of the branch circuits 10A and 10B. As the switching unit 14, examples of a device enabling electrical shutoff include a breaker, an electromagnetic contactor, and a relay. The switching operation of this switching unit 14 is controlled by the control unit 50, which will be described later.

[Circulation Mechanism]

The circulation mechanism 20A circulates a positive electrode electrolyte and a negative electrode electrolyte through the battery cell parts 12A and 12B, to thereby cause the battery cell parts 12A and 12B to be charged or discharged. The circulation mechanism 20A includes a positive electrode electrolyte tank 21, which stores the positive electrode electrolyte; a negative electrode electrolyte tank 22, which stores the negative electrode electrolyte; pumps 23 and 24, which circulate the electrolytes stored in the tanks 21 and 22 through the battery cell parts 12A and 12B; and ducts 25 to 28, which connect the tanks 21 and 22 and the pumps 23 and 24 to the battery cell parts 12A and 12B. In FIG. 1, the arrows within the ducts 25 to 28 represent an example of directions in which the electrolytes flow. This also applies to FIGS. 2 to 5. Such a circulation mechanism may be commonly used by plural battery cell parts connected in parallel. In this embodiment, a single circulation mechanism 20A is commonly used by the battery cell parts 12A and 12B.

The positive electrode electrolyte and the negative electrode electrolyte may employ, for example, (1) a V-based single-electrolyte system in which the electrolytes for both electrodes contain vanadium ions, (2) a Ti/Mn-based two-electrolyte system in which the positive electrode electrolyte contains manganese ions and the negative electrode electrolyte contains titanium ions, (3) a Ti/Mn-based system in which the positive electrode electrolyte contains manganese ions and titanium ions, and the negative electrode electrolyte contains titanium ions, or (4) a Ti/Mn-based single-electrolyte system in which the electrolytes for both electrodes contain manganese ions and titanium ions. Such electrolytes for both electrodes may be known electrolytes.

[Detection Unit]

The detection unit 30 detects physical quantities correlating with the open circuit voltages of the battery cell parts 12A and 12B. The physical quantities correlating with the open circuit voltages may be the open circuit voltages themselves or non-electrical quantities correlating with the flow states of electrolytes in the battery cell parts. These physical quantities will be described later.

[Determination Unit]

The determination unit 40 determines, on the basis of the physical quantities detected by the detection unit 30, as to whether or not a voltage difference between the open circuit voltages of the battery cell parts 12A and 12B is more than a predetermined value. The voltage difference between the battery cell parts 12A and 12B is preferably 20% or less, more preferably 10% or less, particularly preferably 5%, most preferably 0%. This voltage difference between the battery cell parts 12A and 12B is determined directly or indirectly on the basis of physical quantities detected by the detection unit 30. Such predetermined values (thresholds) specific to the types of physical quantities used for the determination may be stored in a memory unit. The determination unit 40 reads a threshold from the memory unit in accordance with the physical quantities detected and compares the detected physical quantities with the threshold.

[Control Unit]

The control unit 50 controls the switching operation of the switching unit 14 in accordance with the result from the determination unit 40. The control unit 50 includes a conduction control unit 51 and a shutoff control unit 52. When the determination unit 40 determines the voltage difference to be more than a predetermined value, the shutoff control unit 52 switches the switching unit 14 to the non-conducting state (off) such that the closed loop is brought into the non-conducting state. When the determination unit 40 determines the voltage difference to be equal to or less than a predetermined value, the conduction control unit 51 switches the switching unit 14 to the conducting state (on) such that the closed loop is brought into the conducting state.

Different types of physical quantities correlating with the open circuit voltages of the battery cell parts 12A and 12B involve different detection units 30 and also different determination methods performed by the determination unit 40. Hereinafter, description will be made regarding such detection units 30, determination unit 40, and control unit 50 used in accordance with the types of physical quantities correlating with the open circuit voltages.

Physical Quantities: Open Circuit Voltages

The determination and control are performed on the basis of the open circuit voltages themselves of the battery cell parts 12A and 12B. As the detection unit 30, for example, monitor cells may be used. The monitor cells are constituted by some battery cells of the battery cell parts 12A and 12B. Some battery cells of the battery cell parts 12A and 12B are used as the monitor cells, so that the open circuit voltages within the battery cell parts 12A and 12B can be accurately ascertained in real time, compared with the case where monitor cells are installed in addition to the battery cell parts 12A and 12B. The electrolyte circulated and supplied to the monitor cells is the same electrolyte similarly circulated and supplied as in the battery cell parts 12A and 12B. The battery cells constituting the monitor cells are not used for charge or discharge, but are used to measure the open circuit voltages of the battery cell parts 12A and 12B. The open circuit voltages are measured with voltmeters connected to the monitor cells. When the voltage difference between the battery cell parts 12A and 12B is determined to be equal to or less than the predetermined value on the basis of the values of the monitor cells of the battery cell parts 12A and 12B, the switching unit 14 is switched to the conducting state. In other words, while the voltage difference between the battery cell parts 12A and 12B is determined to be more than the predetermined value, the switching unit 14 remains in the non-conducting state. When the switching unit 14 is in the conducting state and the determination unit 40 determines the voltage difference between the battery cell parts 12A and 12B to be more than the predetermined value, the switching unit 14 is switched to the non-conducting state. Such control based on open circuit voltages is effective regardless of the presence or absence of the electrolyte within the battery cell parts 12A and 12B and the state of charge of the electrolyte at the time of supply of the electrolyte to the battery cell parts 12A and 12B.

Physical Quantities: Non-Electrical Quantities Correlating with Flow States of Electrolyte As the physical quantities correlating with the open circuit voltages of the battery cell parts 12A and 12B, non-electrical quantities correlating with the flow states of the electrolyte are selected; and the determination and control are performed on the basis of these non-electrical quantities. In this case, an electrolyte detection unit (detection unit 30) is provided that detects non-electrical quantities correlating with the flow states of the electrolyte in the battery cell parts 12A and 12B. As long as the battery cell parts 12A and 12B contain an electrolyte of the same composition and the same state of charge, the open circuit voltages of the battery cell parts depend on the amounts of electrolyte within the battery cell parts 12A and 12B. In particular, the fact that the battery cell parts 12A and 12B are fully filled with the electrolyte can be ascertained on the basis of the flow states of the electrolyte described later. Accordingly, non-electrical quantities correlating with the flow states of the electrolyte within the battery cell parts 12A and 12B are detected, so that the open circuit voltages of the battery cell parts can be ascertained. Hereinafter, specific examples of the non-electrical quantities will be described.

The non-electrical quantities may be elapsed times from the starting of the operations of the pumps 23 and 24. In this case, the detection unit 30 includes a timer configured to detect the elapsed times. Such time-based control is particularly effective when, at the time of supply of the electrolyte to the battery cell parts 12A and 12B, the battery cell parts 12A and 12B are not filled with the electrolyte and are empty, or the battery cell parts 12A and 12B are filled with an electrolyte completely self-discharged. Times are decided in consideration of conditions such as the flow rates of the electrolyte from the pumps 23 and 24, the volumes of the ducts 25 and 26 for introducing the electrolyte to the battery cell parts 12A and 12B, and the volumes of the electrolyte within the battery cell parts 12A and 12B. Specifically, the correlations between the times decided in consideration of the above-described conditions and the amounts of supplied electrolyte filling the battery cell parts 12A and 12B are measured in advance. On the basis of these correlations, the times at which the amounts of electrolyte filling the battery cell parts 12A and 12B become substantially uniform are set as the predetermined times. When the predetermined times have elapsed, the voltage difference between the battery cell parts 12A and 12B is determined to be equal to or less than the predetermined value, and the control of switching the switching unit 14 to the conducting state is performed.

The voltage difference between the battery cell parts 12A and 12B reaches 20% or less when, for example, all the battery cell parts 12A and 12B are filled with the electrolyte such that its amount accounts for 90% or more of the electrolyte capacity of each battery cell part. The amount of the filling electrolyte relative to the electrolyte capacity of each battery cell part is preferably 95% or more, more preferably 98% or more, particularly preferably 100%. For example, the times are preferably set to times approximately at which all the battery cell parts 12A and 12B have been fully filled with the electrolyte supplied after the starting of the operations of the pumps 23 and 24, or the electrolyte within all the battery cell parts 12A and 12B has been replaced by the electrolyte supplied after the starting of the operations of the pumps 23 and 24.

Other non-electrical quantities may be the accumulated amounts of electrolyte individually supplied to the battery cell parts 12A and 12B after the starting of the operations of the pumps 23 and 24. In this case, the detection unit 30 includes flowmeters configured to detect the flow rates of the electrolyte supplied into the battery cell parts 12A and 12B. The flowmeters are disposed, for example, in the battery cell parts 12A and 12B and their upstream or downstream ducts; and the accumulated amounts of electrolyte supplied are calculated from the values of the flowmeters and the times for which the electrolyte is supplied at the flow rates. The obtained accumulated supply amounts are compared with the electrolyte capacities of the battery cell parts 12A and 12B to ascertain the amounts of electrolyte within the battery cell parts 12A and 12B; and determination is made as to whether or not a voltage difference that is more than a predetermined value is generated between the battery cell parts 12A and 12B. Specifically, this determination is as to whether or not the ratios (filling amounts (%)) of the accumulated supply amounts to the electrolyte capacities of the battery cell parts 12A and 12B are 90% or more. When the voltage difference is determined to be equal to or less than the predetermined value, the switching unit 14 is switched to the conducting state. In other words, while the voltage difference between the battery cell parts 12A and 12B is determined to be more than the predetermined value, the switching unit 14 remains in the non-conducting state. When the switching unit 14 is in the conducting state and the determination unit 40 determines the voltage difference between the battery cell parts 12A and 12B to be more than the predetermined value, the switching unit 14 is switched to the non-conducting state. The flowmeters may be disposed in the inlet ducts 25 and 26 for the battery cell parts 12A and 12B. In this case, the amounts of electrolyte supplied to the battery cell parts 12A and 12B are detectable, which facilitates ascertainment of the accumulated supply amounts relative to the electrolyte capacities of the battery cell parts 12A and 12B. The flowmeters may also be disposed in the outlet ducts 27 and 28 for the battery cell parts 12A and 12B. The flowmeters may be disposed in any positions of the electrolyte circulation ducts (ducts 25 to 28).

Other non-electrical quantities may be pressures within the battery cell parts 12A and 12B. In this case, the detection unit 30 includes pressure gauges disposed within the battery cell parts 12A and 12B and configured to measure the internal pressures of the battery cell parts 12A and 12B. Such pressure-based control is particularly effective when, at the time of supply of the electrolyte to the battery cell parts 12A and 12B, the battery cell parts 12A and 12B are not filled with the electrolyte and are empty. As the filling of the battery cell parts 12A and 12B with the electrolyte proceeds, the pressures increase. Thus, the amounts of electrolyte are ascertained in correlation with the pressures within the battery cell parts. The amounts of electrolyte filling the battery cell parts 12A and 12B are ascertained on the basis of the pressure gauges in the battery cell parts 12A and 12B, and determination is made as to whether or not a voltage difference that is more than a predetermined value is generated. Specifically, the pressure within each battery cell part at the time when the electrolyte filling amount (%) of the battery cell part is, for example, 90% or more is stored as the predetermined value (threshold) in a memory unit; and determination is made as to whether or not the detected pressure is more than the threshold. The control unit preforms control on the basis of the determination result as in the above-described case of using flowmeters.

Other non-electrical quantities may relate to image recognition of performing image processing of the flow states of the electrolyte within the battery cell parts 12A and 12B. In this case, the detection unit 30 includes transparent windows in the ducts connected the battery cell parts 12A and 12B, and, for example, cameras configured to capture images of the electrolyte through the transparent windows. As illustrated in FIG. 1, when the circulation mechanism 20A has a configuration in which the electrolyte is supplied from below and drained from above the battery cell parts 12A and 12B, portions of the outlet ducts 27 and 28 out of the ducts connected to the battery cell parts 12A and 12B may have transparent windows. When the battery cell parts 12A and 12B are filled with the electrolyte, the electrolyte flows through the outlet ducts 27 and 28. Thus, by detecting the presence of the electrolyte flowing through the outlet ducts 27 and 28, the amounts of electrolyte within the battery cell parts 12A and 12B can be ascertained. Such image-recognition-based ascertainment of the amounts of electrolyte is particularly effective when, at the time of supply of the electrolyte to the battery cell parts 12A and 12B, the battery cell parts 12A and 12B are not filled with the electrolyte and are empty. This is because, when the electrolyte is supplied to the battery cell parts 12A and 12B that are empty and the presence of the electrolyte is detected in the outlet ducts 27 and 28, the battery cell parts 12A and 12B are determined to be fully filled with the electrolyte. Furthermore, image recognition of the state-of-charge hue of electrolyte may be employed. Some electrolytes have different hues depending on the state of charge. Thus, when the difference between the hues of the battery cell parts is equal to or less than a predetermined value (threshold), the voltage difference between the open circuit voltages of the battery cell parts can be determined to be appropriate. This is effective, at the time of supply of the electrolyte to the battery cell parts 12A and 12B, regardless of the presence or absence of the electrolyte within the battery cell parts 12A and 12B and regardless of the state of charge of the electrolyte. When a specific electrolyte is found to flow through the outlet ducts 27 and 28, this indicates that the battery cell parts 12A and 12B are fully filled with the electrolyte or the electrolyte within the battery cell parts 12A and 12B is completely replaced, which indirectly tells the voltage difference between the battery cell parts 12A and 12B. Thus, when a specific electrolyte is detected by image recognition for both of the battery cell parts 12A and 12B, the voltage difference between the battery cell parts 12A and 12B is determined to be equal to or less than the predetermined value and the switching unit 14 is controlled to be switched to the conducting state. Instead of the hue detected by image recognition, the transmittance of light through the transparent windows may be used to determine the presence or absence of the electrolyte or the hue of the electrolyte. For example, a detection light beam such as a laser is applied, from one of diametrically opposed sides of a transparent window region of an outlet duct, to the transparent window, and the transmitted light from the outlet duct is detected on the other side by a photodetector; and the detected intensity can be used to detect the presence or absence of the electrolyte or the hue of the electrolyte.

When the determination unit 40 determines the voltage difference to be more than the predetermined value, the shutoff control unit 52 brings the switching unit 14 to the non-conducting state (off) such that the closed loop is in the non-conducting state. In addition, the shutoff control unit 52 is a control unit also used at the time when the operation of the RF battery is terminated and shifted to a standby state. The shutoff control unit 52 includes at least one of a first shutoff control unit 52a and a second shutoff control unit 52β, which employ different triggers for bringing the switching unit 14 into the non-conducting state.

First Shutoff Control Unit

The first shutoff control unit 52α in which the pumps 23 and 24 are selected as the trigger for providing the non-conducting state, switches the switching unit 14 to the non-conducting state at the time of stopping of the pumps 23 and 24.

Second Shutoff Control Unit

The second shutoff control unit 52β in which the alternating current/direct current converter 300 is selected as the trigger for providing the non-conducting state, switches the switching unit 14 to the non-conducting state at the time of stopping of the alternating current/direct current converter 300.

[Method for Operating RF Battery System]

The RF battery system 1 including the above-described control unit 50 according to Embodiment 1 is configured to control, during supply of the electrolyte to the battery cell parts prior to the starting of the operation of the parallel-connection RF battery, the conduction state of the electrically connected closed loop formed by the branch circuits 10A and 10B connected in parallel.

In the initial state of the RF battery, at the time of supply of the electrolyte to the battery cell parts 12A and 12B, the control unit 50 first switches the switching unit 14 to the non-conducting state (off) such that the closed loop is in the non-conducting state. In this state, a positive electrode electrolyte and a negative electrode electrolyte are supplied by the commonly used circulation mechanism 20A to the battery cell parts 12A and 12B. At this time, physical quantities correlating with the open circuit voltages of the battery cell parts 12A and 12B are detected with the detection unit 30. This detection unit 30 is selected in accordance with the type of physical quantities. The data (signals) detected by the detection unit 30 is received by the determination unit 40 via wires or by radio. The determination unit 40 determines, on the basis of the received data, as to whether or not a voltage difference between the open circuit voltages of the battery cell parts 12A and 12B is more than a predetermined value. As a result of this determination, when the voltage difference is more than the predetermined value, the control unit 50 leaves the switching unit 14 in the non-conducting state such that the closed loop is in the non-conducting state. As long as the closed loop is in the non-conducting state, no current flows even in the presence of such a voltage difference between the battery cell parts 12A and 12B. When the determination unit 40 provides a result that the voltage difference is equal to or less than the predetermined value, the control unit 50 switches the switching unit 14 to the conducting state (on) such that the closed loop is in the conducting state.

Subsequently, when the RF battery is brought into a standby state, the pumps 23 and 24 are stopped. The control unit 50 receives the stop signals for the pumps 23 and 24 and, these stop signals trigger switching of the switching unit 14 to the non-conducting state (off) such that the closed loop is in the non-conducting state. Such control of switching the switching unit 14 to the non-conducting state may employ, as the trigger, instead of the stop signals for the pumps 23 and 24, stop signals for the alternating current/direct current converter 300.

When the RF battery on standby is operated again, as described above, while physical quantities correlating with the open circuit voltages of the battery cell parts 12A and 12B are detected with the detection unit 30, the electrolyte is supplied to the battery cell parts 12A and 12B. The determination unit 40 determines, on the basis of the received data, as to whether or not a voltage difference between the open circuit voltages of the battery cell parts 12A and 12B is more than a predetermined value. As a result of the determination, when the voltage difference is more than the predetermined value, the control unit 50 leaves the switching unit 14 in the non-conducting state such that the closed loop is in the non-conducting state. When the voltage difference is equal to or less than the predetermined value, the control unit 50 switches the switching unit 14 to the conducting state (on) such that the closed loop is in the conducting state.

<Embodiment 2>

Figure 2:
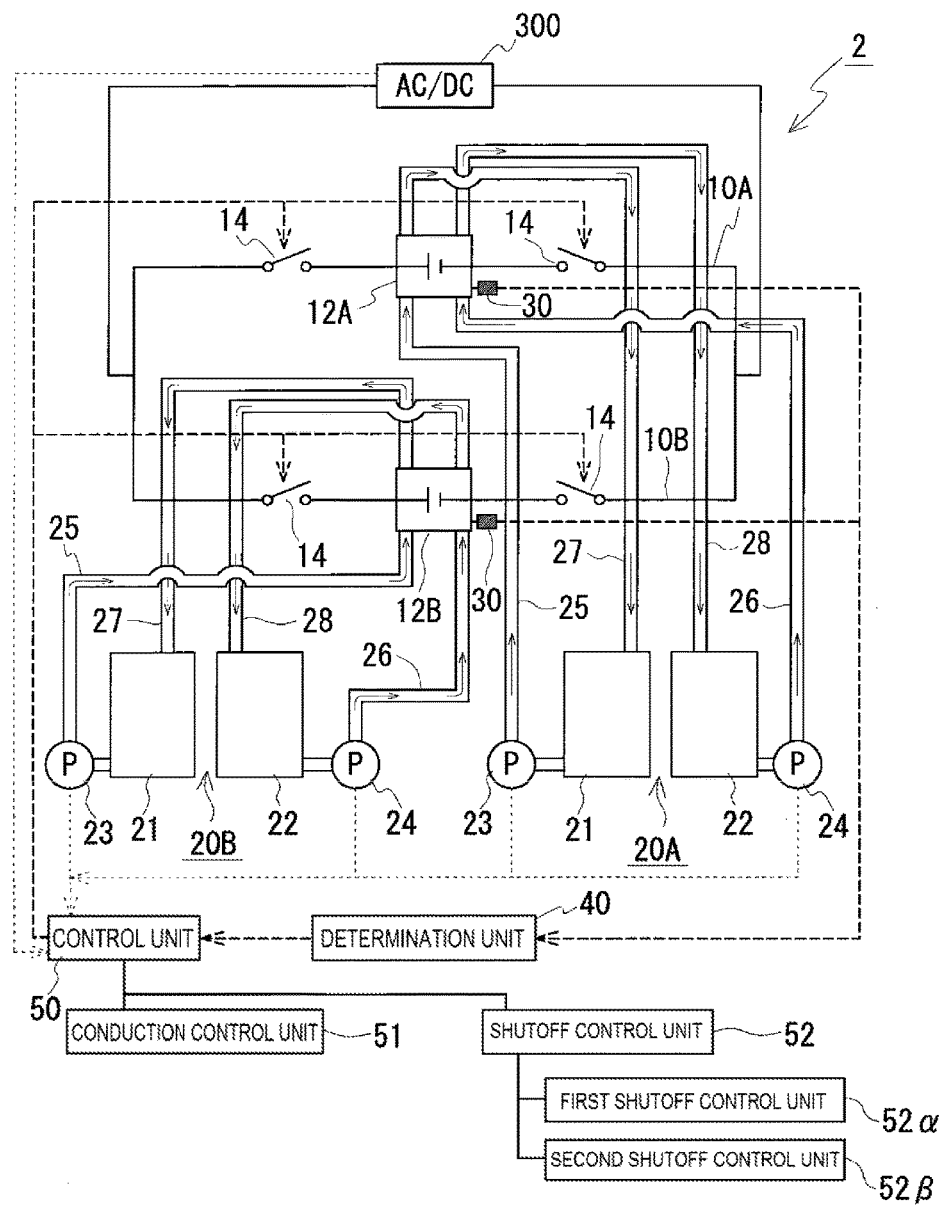
FIG. 2 is a schematic diagram illustrating the configuration of a redox flow battery system according to Embodiment 2.

As illustrated in FIG. 2, the supply of electrolytes to the battery cell parts 12A and 12B may be performed with different circulation mechanisms 20A and 20B. Embodiment 2 is the same as Embodiment 1 except that the battery cell parts 12A and 12B each have an independent circulation mechanism. The two independent circulation mechanisms 20A and 20B have the same configurations as in Embodiment 1. Even in the case of using the two circulation mechanisms 20A and 20B having the same configuration, when, for example, the distance between the pumps 23 and 24 of the circulation mechanism 20A and the battery cell part 12A is different from the distance between the pumps 23 and 24 of the circulation mechanism 20B and the battery cell part 12B, non-uniformity may be caused between the amount of electrolyte in the battery cell part 12A and the amount of electrolyte in the battery cell part 12B. In addition, the performances of the pumps 23 and 24 (for example, a degraded performance due to deterioration) may result in different electrolyte filling states of the battery cell parts 12A and 12B. Thus, the difference in the electrolyte filling amounts results in a voltage difference between the open circuit voltages of the battery cell parts 12A and 12B. For this reason, as in Embodiment 1, the physical quantities correlating with the open circuit voltages of the battery cell parts 12A and 12B are detected with the detection unit 30; the determination unit 40 determines, on the basis of the physical quantities, the voltage difference between the battery cell parts 12A and 12B; and the control unit 50 switches the conduction states of the closed loop in response to the determination result.

<Embodiment 3>

Figure 3:
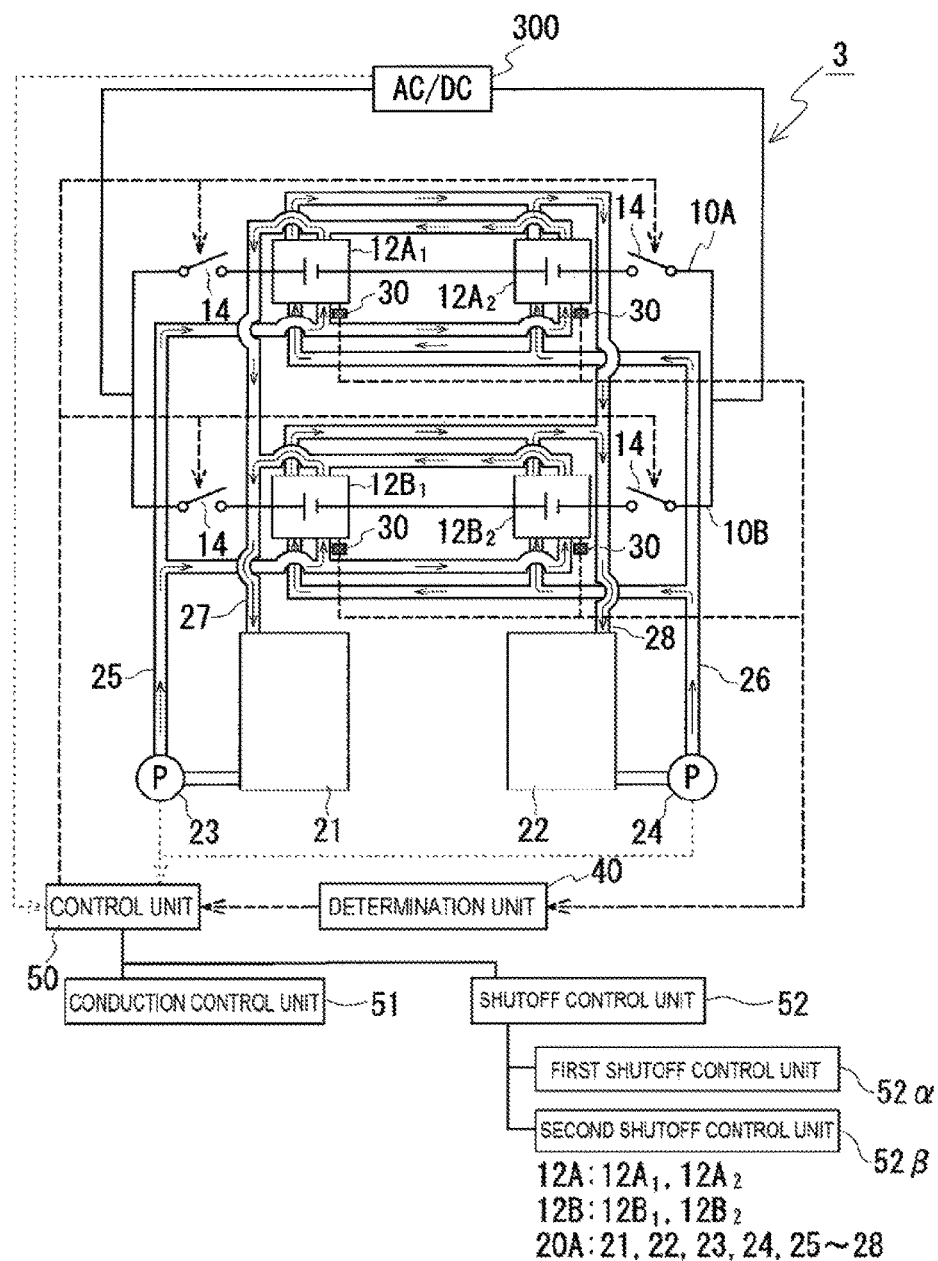
FIG. 3 is a schematic diagram illustrating the configuration of a redox flow battery system according to Embodiment 3.

As illustrated in FIG. 3, battery cell parts may be connected in parallel such that, in each of the branch circuits 10A and 10B, plural battery cell parts are electrically connected in series. Embodiment 3 is the same as Embodiment 1 except that two branch circuits each including two battery cell parts connected in series are connected in parallel. In Embodiment 3, the branch circuit 10A includes two battery cell parts $12A_1$ and $12A_2$ electrically connected in series, and the branch circuit 10B includes two battery cell parts $12B_1$ and $12B_2$ electrically connected in series. These two branch circuits 10A and 10B are electrically connected in parallel. The switching unit 14 is provided in both end portions of each of the branch circuits 10A and 10B. The electrolyte is supplied by a commonly used single circulation mechanism 20A to plural battery cell parts $12A_1$, $12A_2$, $12B_1$, and $12B_2$.

As in Embodiment 1, in Embodiment 3, physical quantities correlating with the open circuit voltages of the battery cell parts $12A_1$, $12A_2$, $12B_1$, and $12B_2$ are detected with the detection unit 30; the determination unit 40 makes determinations, on the basis of the physical quantities, in terms of the voltage differences between the open circuit voltages of the battery cell parts $12A_1$, $12A_2$, $12B_1$, and $12B_2$; and the control unit 50 switches the conduction states of the closed loop in response to the determination result. The amount of electrolyte supplied to a battery cell part tends to decrease with an increase in the distance from the pump. Thus, even between the two battery cell parts $12A_1$ and $12A_2$ ($12B_1$ and $12B_2$) connected in series in the branch circuits 10A and 10B, the amounts of electrolyte may become non-uniform. For this reason, the open circuit voltages of battery cell parts are preferably detected for all the battery cell parts $12A_1$, $12A_2$, $12B_1$, and $12B_2$ with the detection unit 30. For example, when monitor cells are used as the detection unit 30, monitor cells are preferably disposed for the battery cell parts $12A_1$, $12A_2$, $12B_1$, and $12B_2$ to detect the open circuit voltages of the battery cell parts $12A_1$, $12A_2$, $12B_1$, and $12B_2$.

<Embodiment 4>

Figure 4:
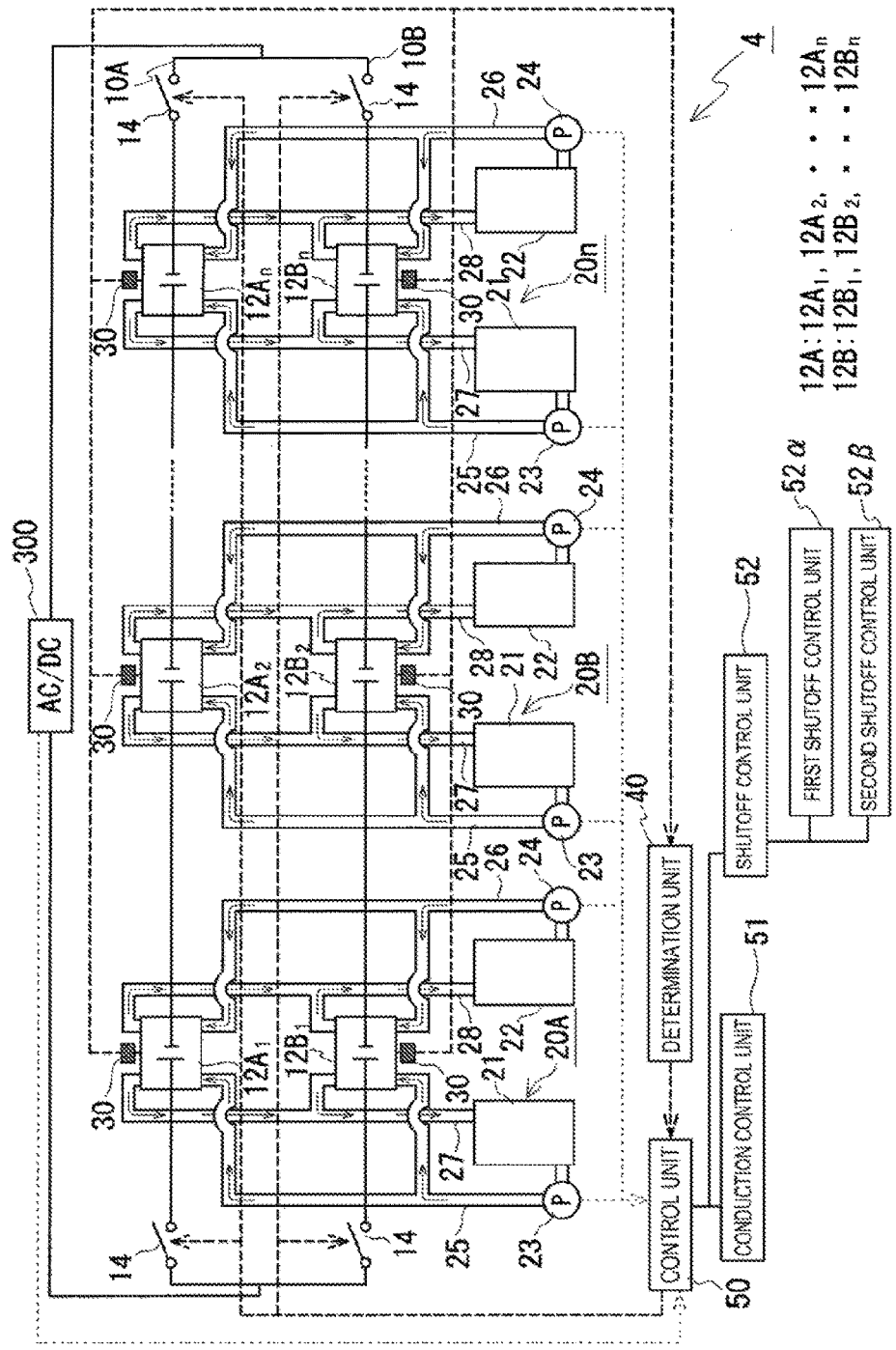
FIG. 4 is a schematic diagram illustrating the configuration of a redox flow battery system according to Embodiment 4.

As illustrated in FIG. 4, battery cell parts may be connected in parallel such that, in each of the branch circuits 10A and 10B, plural battery cell parts are electrically connected in series, and an electrolyte is supplied to a battery cell part selected from the branch circuit 10A and a battery cell part selected from the branch circuit 10B by a circulation mechanism commonly used by these battery cell parts. In other words, circulation mechanisms are provided so as to correspond to the number of the battery cell parts connected in series in each of the branch circuits 10A and 10B. Embodiment 4 is the same as Embodiment 3 except for the number of battery cell parts connected in series in each of the branch circuits 10A and 10B and except that circulation mechanisms are provided so as to correspond to this number. In Embodiment 4, the branch circuit 10A includes plural battery cell parts $12A_1$, $12A_2$, . . . , and $12A_n$ electrically connected in series, and the branch circuit 10B includes plural battery cell parts $12B_1$, $12B_2$, . . . , and $12B_n$ electrically connected in series. These two branch circuits 10A and 10B are electrically connected in parallel. The switching unit 14 is provided in both end portions of each of the branch circuits 10A and 10B. An electrolyte is supplied by a circulation mechanism 20A to the battery cell part $12A_1$ of the branch circuit 10A and the battery cell part $12B_1$ of the branch circuit 10B; similarly, an electrolyte is supplied by a circulation mechanism 20n to the battery cell part $12A_n$ of the branch circuit 10A and the battery cell part $12B_n$ of the branch circuit 10B. As in Embodiment 3, in Embodiment 4, the detection unit 30 detects physical quantities correlating with the open circuit voltages of the battery cell parts $12A_1$, $12A_2$, . . . , $12A_n$, $12B_1$, $12B_2$, . . . , and $12B_n$; the determination unit 40 makes determinations, on the basis of the physical quantities, in terms of the voltage differences between the open circuit voltages of the battery cell parts; and the control unit 50 switches the conduction states of the closed loop in response to the determination result.

<Embodiment 5>

Figure 5:
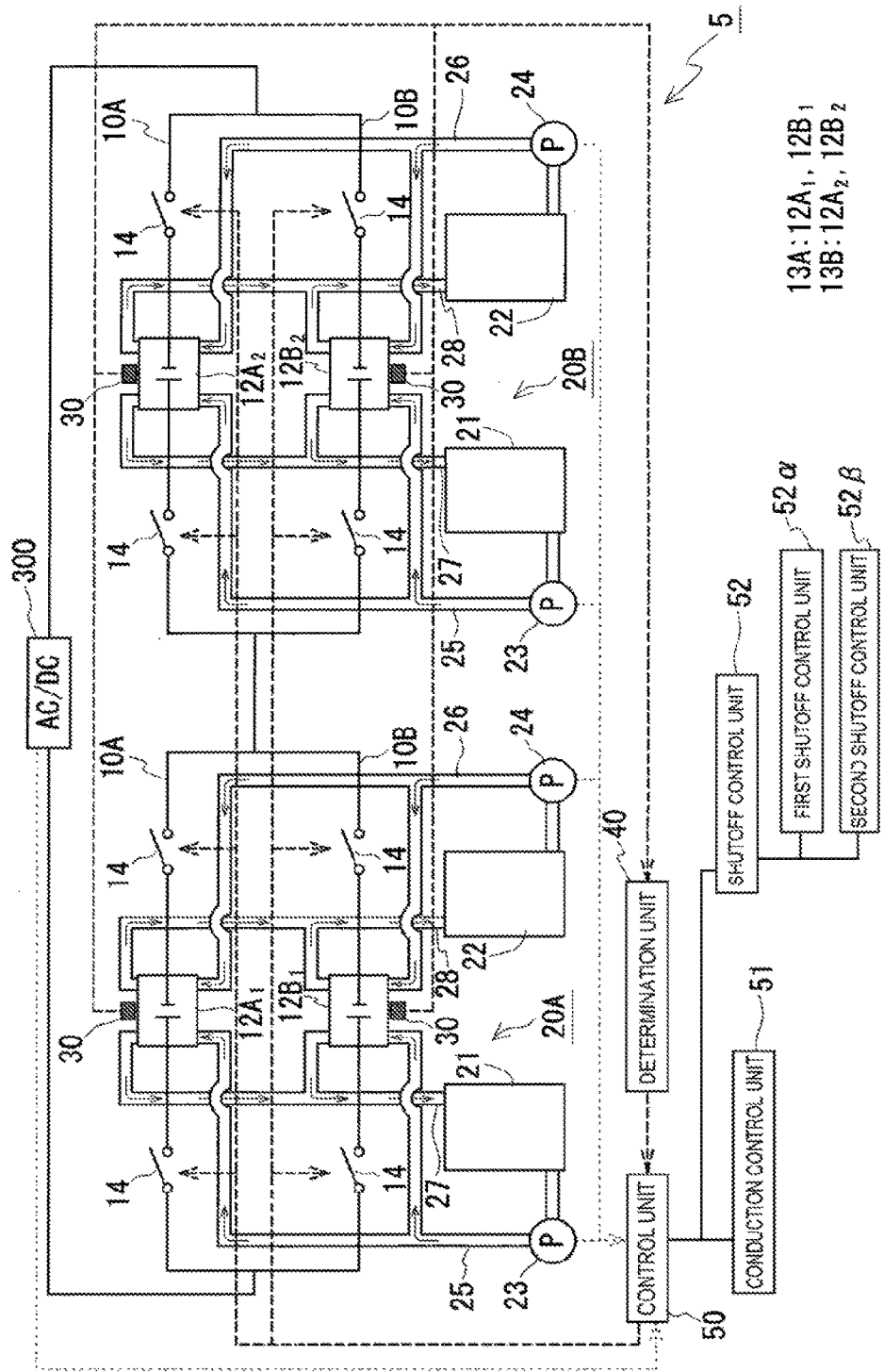
FIG. 5 is a schematic diagram illustrating the configuration of a redox flow battery system according to Embodiment 5.

As illustrated in FIG. 5, groups of parallel cells, which are connected in parallel, may have a configuration in which plural parallel cell groups 13A and 13B are electrically connected in series. The parallel cell group 13A includes battery cell parts $12A_1$ and $12B_1$ electrically connected in parallel in branch circuits 10A and 10B. Similarly, the parallel cell group 13B includes battery cell parts $12A_2$ and $12B_2$ electrically connected in parallel in branch circuits 10A and 10B. The configuration of each of the battery cell parts $12A_1$, $12B_1$, $12A_2$, and $12B_2$ is the same as in Embodiment 1. The switching unit 14 is provided in both end portions of each of the branch circuits 10A and 10B in each of the parallel cell groups 13A and 13B. In Embodiment 5, the closed loop is formed in each of the parallel cell groups 13A and 13B. Thus, the switching unit 14 needs to be provided so as to enable switching of the conduction states of the closed loop in each of the parallel cell groups 13A and 13B. An independent circulation mechanism is provided for each of the parallel cell groups 13A and 13B. An electrolyte is supplied by a circulation mechanism 20A to the battery cell parts $12A_1$ and $12B_1$ of the branch circuits 10A and 10B in the parallel cell group 13A; similarly, an electrolyte is supplied by a circulation mechanism 20B to the battery cell parts $12A_2$ and $12B_2$ of the branch circuits 10A and 10B in the parallel cell group 13B.

As in Embodiment 1, in Embodiment 5, the detection unit 30 detects physical quantities correlating with the open circuit voltages of the battery cell parts $12A_1$, $12A_2$, $12B_1$, and $12B_2$; the determination unit 40 makes determinations, on the basis of the physical quantities, in terms of the voltage differences between the open circuit voltages of the battery cell parts $12A_1$, $12A_2$, $12B_1$, and $12B_2$; and the control unit 50 switches the conduction states of the closed loops in response to the determination result. In Embodiment 5, since a closed loop is formed for each of the parallel cell groups 13A and 13B, a comparison is made for the voltage difference between the battery cell parts $12A_1$ and $12B_1$ of the parallel cell group 13A, and a comparison is made for the voltage difference between the battery cell parts $12A_2$ and $12B_2$ of the parallel cell group 13B. When the voltage difference between the battery cell parts $12A_1$ and $12B_1$ of the parallel cell group 13A is more than the predetermined value, the switching unit 14 is switched to the non-conducting state such that the closed loop is in the non-conducting state. As a result, no current flows even in the presence of such a voltage difference between the battery cell parts $12A_1$ and $12B_1$. Similarly, when the voltage difference between the battery cell parts $12A_2$ and $12B_2$ of the parallel cell group 13B is more than the predetermined value, the switching unit 14 is switched to the non-conducting state such that the closed loop is in the non-conducting state. As a result, no current flows even in the presence of such a voltage difference between the battery cell parts $12A_2$ and $12B_2$.

INDUSTRIAL APPLICABILITY

A redox flow battery system according to the present invention is suitably usable as a high-capacity storage battery for the purpose of, for example, smoothing of output variations, storage of surplus power, and load leveling of power generators employing natural energy. A method for operating a redox flow battery system according to the present invention is usable for the operation of a redox flow battery system including plural battery cell parts connected in parallel.

REFERENCE SIGNS LIST 1, 2, 3, 4, and 5 redox flow battery systems (RF battery systems)
10A and 10B branch circuits
12A, $12A_1$, $12A_2$, $12A_n$, 12B, $12B_1$, $12B_2$, and $12B_n$ battery cell parts
13A and 13B parallel cell groups
14 switching unit
20A, 20B, and 20n circulation mechanisms
21 positive electrode electrolyte tank; 22 negative electrode electrolyte tank
23 and 24 pumps; 25 to 28 ducts
30 detection unit; 40 determination unit
50 control unit
51 conduction control unit
52 shutoff control unit
52α first shutoff control unit; 52β second shutoff control unit
100 redox flow battery (RF battery)
100C battery cell
101 membrane; 102 positive electrode cell; 103 negative electrode cell
104 positive electrode; 105 negative electrode
106 positive electrode electrolyte tank; 107 negative electrode electrolyte tank
108 to 111 ducts
112 and 113 pumps
200 cell stack
120 cell frame; 121 bipolar plate; 122 frame
123 and 124 liquid supply manifolds; 125 and 126 liquid drainage manifolds
127 sealing structure
300 alternating current/direct current converter (AC/DC)

The invention claimed is:

1. A redox flow battery system comprising:
a plurality of branch circuits electrically connecting a plurality of battery cell parts in parallel;
a switching unit configured to switch conduction states of a closed loop in which the branch circuits are connected together;
a circulation mechanism including a tank configured to store an electrolyte, and a pump configured to circulate the electrolyte from the tank to the battery cell parts;
a detection unit configured to detect physical quantities correlating with open circuit voltages of the battery cell parts;
a determination unit configured to determine, on a basis of the physical quantities detected by the detection unit, as to whether or not a voltage difference between the open circuit voltages of the battery cell parts is more than a predetermined value; and
a control unit configured to control a switching operation of the switching unit such that, when the determination unit determines the voltage difference to be more than the predetermined value, the closed loop is brought into a non-conducting state and, when the determination unit determines the voltage difference to be equal to or less than the predetermined value, the closed loop is brought into a conducting state.

2. The redox flow battery system according to claim 1, wherein the switching unit is provided in both end portions of each branch circuit.

3. The redox flow battery system according to claim 1, wherein the detection unit includes a voltmeter configured to detect the open circuit voltages, and
the determination unit is configured to determine, on a basis of the open circuit voltages, as to whether or not the voltage difference that is more than the predetermined value is generated.

4. The redox flow battery system according to claim 1, wherein the control unit includes a first shutoff control unit configured to switch the switching unit such that the closed loop is in the non-conducting state during stopping of the pump.

5. The redox flow battery system according to claim 1, comprising an alternating current/direct current converter electrically connected to the battery cell parts,
   wherein the control unit includes a second shutoff control unit configured to switch the switching unit such that the closed loop is in the non-conducting state during stopping of the alternating current/direct current converter.

6. The redox flow battery system according to claim 1, wherein the detection unit includes an electrolyte detection unit configured to detect a non-electrical quantity correlating with flow states of the electrolyte in the battery cell parts, and
   the determination unit is configured to determine, on a basis of the non-electrical quantity, as to whether or not the voltage difference that is more than the predetermined value is generated.

7. The redox flow battery system according to claim 6, wherein the detection unit includes a timer, this timer is configured to detect, as the non-electrical quantity, a time elapsed from starting of an operation of the pump, and the determination unit is configured to determine, on a basis of as to whether or not the time reaches a predetermined time, as to whether or not the voltage difference that is more than the predetermined value is generated.

8. A method for operating a redox flow battery system in which an electrolyte is circulated through a plurality of battery cell parts that are electrically connected in parallel via a plurality of branch circuits, the method comprising:
   a step of detecting physical quantities correlating with open circuit voltages of the battery cell parts;
   a step of determining, on a basis of the physical quantities, as to whether or not a voltage difference between the open circuit voltages of the battery cell parts is more than a predetermined value; and
   a step of, on a basis of a result of the determination, when the voltage difference is more than the predetermined value, bringing a closed loop in which the branch circuits are connected together into a non-conducting state and, when the voltage difference is equal to or less than the predetermined value, bringing the closed loop into a conducting state.

* * * * *